United States Patent
Ibrahimkutty et al.

(10) Patent No.: US 9,742,818 B2
(45) Date of Patent: Aug. 22, 2017

(54) PUSHING EVENTS TO WEB PAGES USED FOR INTERACTION WITH APPLICATIONS

(71) Applicant: Oracle International Corporation, Redwood Shores, CA (US)

(72) Inventors: Asif Ibrahimkutty, Trivandrum (IN); Biju Narayanan, Trivandrum (IN); Deepankar Narayanan, Trivandrum (IN); Raghu Hanumanthaiah Edalur, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 14/566,697

(22) Filed: Dec. 10, 2014

(65) Prior Publication Data

US 2016/0173538 A1    Jun. 16, 2016

(51) Int. Cl.
*H04L 29/06* (2006.01)
*H04L 29/08* (2006.01)

(52) U.S. Cl.
CPC .......... *H04L 65/1073* (2013.01); *H04L 67/26* (2013.01); *H04L 67/42* (2013.01)

(58) Field of Classification Search
CPC ....................................................... H04L 29/06
See application file for complete search history.

(56) References Cited

U.S. PATENT DOCUMENTS

| | | | |
|---|---|---|---|
| 7,072,934 B2 | 7/2006 | Helgeson et al. | |
| 7,552,443 B2 | 6/2009 | Upton | |
| 7,912,899 B2 | 3/2011 | Beauchamp et al. | |
| 8,181,254 B1 * | 5/2012 | Kay | G06F 21/121 713/168 |
| 8,630,624 B2 | 1/2014 | Marcellino | |
| 8,719,704 B2 | 5/2014 | Muniswamy et al. | |
| 8,739,249 B1 * | 5/2014 | Kay | G06F 21/00 709/217 |
| 9,451,039 B1 * | 9/2016 | Kay | G06F 21/00 |
| 2002/0049749 A1 * | 4/2002 | Helgeson | G06F 9/468 709/203 |

(Continued)

OTHER PUBLICATIONS

Rocha B P S, Rezende C G, Loureiro A A F, Middleware for multi-client and multi-server mobile applications, Wireless Pervasive Computing, 2007. ISWPC '07. 2nd International Symposium on, Date of Conference: Feb. 5-7, 2007, pp. 1-5 , Publisher: IEEE.

(Continued)

*Primary Examiner* — Jimmy H Tran
(74) *Attorney, Agent, or Firm* — IP Horizons PLLC; Narendra Reddy Thappeta

(57) ABSTRACT

A web server provided according to aspect of the present disclosure maintains registration data indicating the browsers to be notified upon occurrence of corresponding events. Upon receiving notification of occurrence of an event from an application server, the web server determines the set of browsers registered to receive notification of the occurrence of the event, and pushes the event to each of the set of browsers. By relying on a web server for such operation, each of the applications in the application server can be implemented as stateless applications, thereby providing advantages such as scalability and portability.

17 Claims, 9 Drawing Sheets

(56) References Cited

U.S. PATENT DOCUMENTS

| | | | | |
|---|---|---|---|---|
| 2002/0057285 | A1* | 5/2002 | Nicholas, III | G06F 3/04812 715/700 |
| 2003/0009463 | A1* | 1/2003 | Gallant | H04L 12/14 |
| 2003/0093403 | A1* | 5/2003 | Upton | G06F 9/541 |
| 2006/0155814 | A1* | 7/2006 | Bennett | H04L 29/06027 709/207 |
| 2007/0050630 | A1* | 3/2007 | Kumar | H04L 63/18 713/182 |
| 2011/0286586 | A1* | 11/2011 | Saylor | H04M 3/493 379/88.13 |
| 2012/0290740 | A1* | 11/2012 | Tewari | H04W 4/00 709/248 |
| 2013/0007226 | A1* | 1/2013 | White | H04L 65/4076 709/219 |
| 2013/0047034 | A1* | 2/2013 | Salomon | H04W 4/00 714/18 |
| 2013/0067260 | A1* | 3/2013 | Gatta | G06F 1/3209 713/323 |
| 2013/0086151 | A1 | 4/2013 | Guo-Boynton | |
| 2013/0185583 | A1* | 7/2013 | Stewart | G06F 11/3062 713/340 |
| 2014/0006593 | A1* | 1/2014 | Sarawat | H04M 15/58 709/224 |
| 2014/0108564 | A1* | 4/2014 | Tolson | G06F 9/543 709/206 |
| 2015/0113121 | A1* | 4/2015 | Redal Pena | H04L 41/0681 709/224 |

OTHER PUBLICATIONS

Danish M, Parwekar P, PushNotify: Push server application, Advance Computing Conference (IACC), 2013 IEEE 3rd International, Date of Conference:Feb. 22-23, 2013, pp. 377-382, Publisher:IEEE.
Frolund S, Guerraoui R, e-Transactions: end-to-end reliability for three-tier architectures, Software Engineering, IEEE Transactions on Date of Publication :Apr. 2002, pp. 378-395, vol. 28 , Issue: 4 , Publisher:IEEE.
Ali Mesbaha, Arie Van Deursen, A component- and push-based architectural style for ajax applications, Journal of Systems and Software, date Dec. 2008, pp. 2194-2209, vol. 81, Issue 12.

* cited by examiner

View Process Request For

| User ID | PTDMO 🔍 | Type | Last ▼ | 1 | Days ▼ | Refresh |
| Server | ▼ | Name | | | to | |
| Run Status | ▼ | ○ Instance | | | | |

Process List

Personalize | Find | View All | 🗗 📅    First ◀ 1-7 of 7 ▶ Last

| Select | Instance | Seq. | Process Type | Process Name | User | Run Date/Time | Run Status | Distribution Status | Details |
|---|---|---|---|---|---|---|---|---|---|
| ☐ | 24 | | Application Engine | PSXPCLEAN | PTDMO | 11/14/2014 2:48:36AM PST | Queued | N/A | Details |
| ☐ | 23 | | Application Engine | PSXPARCHATTAR | PTDMO | 11/14/2014 2:47:28AM PST | Cancelled | N/A | Details |
| ☐ | 22 | | Application Engine | PSPM_ARCHIVE | PTDMO | 11/14/2014 2:46:38AM PST | Queued | N/A | Details |
| ☐ | 21 | | Application Engine | PRCSYSPURGE | PTDMO | 11/14/2014 2:45:13AM PST | Queued | N/A | Details |
| ☐ | 20 | | Application Engine | PRCSSRVCLN | PTDMO | 11/14/2014 2:44:10AM PST | Initiated | N/A | Details |
| ☐ | 19 | | SQR Report | DDDAUDIT | PTDMO | 11/14/2014 2:43:28AM PST | Queued | N/A | Details |
| ☐ | 18 | | Application Engine | AEMINITEST | PTDMO | 11/14/2014 2:42:18AM PST | Success | Posted | Details |

710  720  730  740  750  760  770

Save    Notify

View Process Request For

| User ID | PTDMO 🔍 | Type | ▼ | Last ▼ | 1 | Days ▼ | Refresh |
| --- | --- | --- | --- | --- | --- | --- | --- |
| Server | | ▼ | Name | | | | |
| Run Status | | ▼ | 🔍 Instance | | to | | |

Process List — Personalize | Find | View All | 📄 | 🏢 — First ◀ 1-7 of 7 ▶ Last

| Select | Instance | Seq. | Process Type | Process Name | User | Run Date/Time | Run Status | Distribution Status | Details |
| --- | --- | --- | --- | --- | --- | --- | --- | --- | --- |
| ☐ | 24 | | Application Engine | PSXPCLEAN | PTDMO | 11/14/2014 2:48:36AM PST | Success | N/A | Details |
| ☐ | 23 | | Application Engine | PSXPARCHATTAR | PTDMO | 11/14/2014 2:47:28AM PST | Cancelled | N/A | Details |
| ☐ | 22 | | Application Engine | PSPM_ARCHIVE | PTDMO | 11/14/2014 2:46:38AM PST | Queued | N/A | Details |
| ☐ | 21 | | Application Engine | PRCSYSPURGE | PTDMO | 11/14/2014 2:45:13AM PST | Queued | N/A | Details |
| ☐ | 20 | | Application Engine | PRCSSRVCLN | PTDMO | 11/14/2014 2:44:10AM PST | Initiated | N/A | Details |
| ☐ | 19 | | SQR Report | DDDAUDIT | PTDMO | 11/14/2014 2:43:28AM PST | Queued | N/A | Details |
| ☐ | 18 | | Application Engine | AEMINITEST | PTDMO | 11/14/2014 2:42:18AM PST | Success | Posted | Details |

710   720   730   740   750   760   770

701–707 point to the rows (Instance 24 through 18).

💾 Save       📋 Notify

FIG. 7B

PUSHING EVENTS TO WEB PAGES USED FOR INTERACTION WITH APPLICATIONS

BACKGROUND OF THE DISCLOSURE

Technical Field

The present disclosure relates to client-server systems, and more specifically to pushing events to web pages at client systems used for interaction with applications at server systems.

Related Art

Web pages are the basis for accessing various types of information available on the world-wide-web. Typically, browser software executing on a client system receives a page definition and renders a web page (as a 'page instance') based on the specification present in the page definition.

Page instances are often used for interaction with applications. The applications are executed in server systems and the applications provide relevant content as a part of the rendered page instances. Users at the web browsers can request the content, view the content, update the content and traverse the content to access additional web pages.

Events are often generated while page instances are rendered at the client systems. An event is a change of state that occurs in server systems. State changes may include actions such as a change to data of interest, or when physical (hardware) or execution entities (threads, applications, etc.) change from one state to another, etc. A change to data of interest typically occurs when a new value is formed for a field (or data element) of interest, though actions such as deletion or addition of data elements also may be viewed as events in corresponding scenarios. Examples of change of status of an execution entity include, for example, completion of execution of a batch process.

There is often a need to notify occurrence of events to web pages presently being rendered. For example, assuming the users of a particular web page would be interested in the occurrence of a state change of interest, it may be desirable to notify such occurrences soon after they occur. As an illustration, assuming a value of a field is sent for display on a web page, and that a new value is generated for that field thereafter, it may be desirable to immediately propagate the change to the web page.

Pushing is a desirable approach to notifying of events to web pages presently being rendered. Pushing implies that the server system initiates transmission of the event to the web page, without waiting for corresponding request from the web pages. Pushing is desirable in that the approach avoids unneeded overhead of pull-based approaches where the browsers may periodically request updated information, without knowledge of whether or not such events had occurred.

Aspects of the present disclosure provide for pushing events to web pages used for interaction with applications.

BRIEF DESCRIPTION OF THE DRAWINGS

Example embodiments of the present disclosure will be described with reference to the accompanying drawings briefly described below.

FIG. 7A is a screenshot depicting the display of a page instance subscribed to an event, in an embodiment.

FIG. 7B is a screenshot depicting the page instance, updated with a new value generated as a part of occurrence of an event, in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

A web server provided according to aspect of the present disclosure maintains registration data indicating the browsers to be notified upon occurrence of corresponding events. Upon receiving notification of occurrence of an event from an application server, the web server determines the set of browsers registered to receive notification of the occurrence of the event, and pushes the event to each of the set of browsers.

By relying on a web server for such operation, each of the applications in the application server can be implemented as stateless applications, thereby providing advantages such as scalability and portability. In addition, the events generated in application servers may be notified in real time (i.e., with minimal delay) to users at the browsers.

In an embodiment, a web server maintains enhanced page data associating each page definition to a corresponding set of events. Upon receiving request for a web page from a client system, the web server forms the web page based on a page definition, with a first set of events being associated with the page definition in the enhanced page data. The web server serves the formed web page to the client system for rendering as a first page instance on a web browser at the client system. The web server adds data to the registration data indicating that the page instance at the client system is subscribed to receive the first set of events.

As the pushing is performed by web servers required for serving web pages otherwise, the features are provided without requiring additional systems for that purpose.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
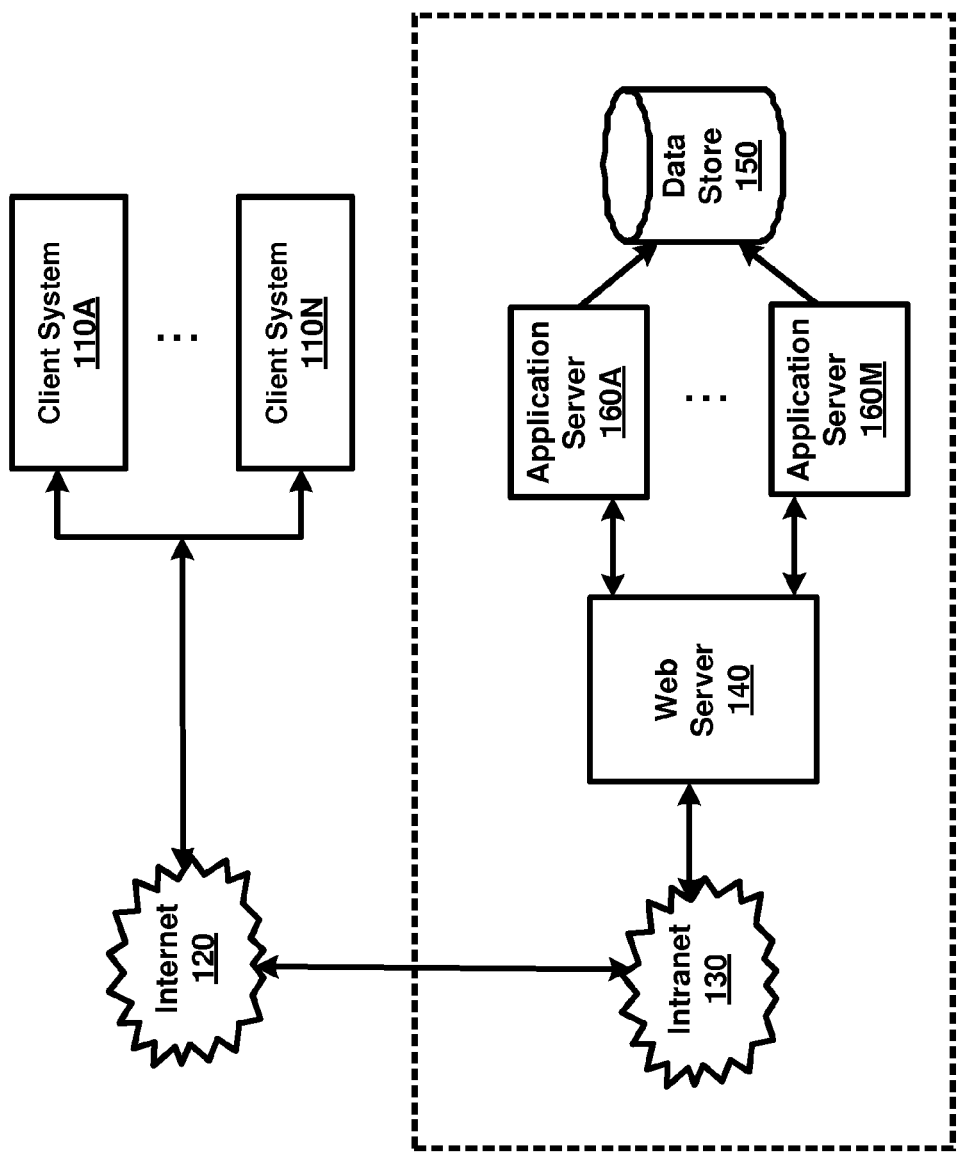
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing client systems 110A-110N, Internet 120, intranet 130, web server 140, data store 150, and application servers 160A-160M.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between web server 140, data store 150, and application servers 160A-160M, all provided within an enterprise (shown with dotted boundaries). Internet 120 extends the connectivity of these (and other systems of the enterprise) with external systems such as client systems 110A-110N.

Each of intranet 130 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by intranet 130 and Internet 120. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Data store 150 represents a non-volatile (persistent) storage facilitating storage and retrieval of data by applications executing in other systems of the enterprise such as application servers 160A-160M and web server 140. For example, data store 150 may be implemented to store data, which would be of interest to end-users operating client systems 110A-110N. Changes (new value formation for a field already storing data, removal of a data element or addition) to such data of interest constitutes occurrence of corresponding events.

Data store 150 may be implemented as a database server using relational database technologies and accordingly provide storage and retrieval of data using structured queries such as SQL (Structured Query Language). Alternatively, or in addition, data store 150 may be implemented as a file server providing storage and retrieval of data in the form of files organized as one or more directories, as is well known in the relevant arts.

Each of client systems 110A-110N represents a system such as a personal computer, workstation, mobile station, mobile phones, computing tablets, etc., used by users to send user requests to applications executing on application servers 160A-160M via web server 140, and display the corresponding responses. The responses may be in the form of web pages and thus the requests may be in the form of Uniform Resource Locators (URLs) with appropriate additional content to specify the user requests. Each client system accordingly executes a browser software for such interactions. The browser in turn is provided with capabilities such as Web Sockets, which permit web server 140 to communicate follow-up content for displaying on an already rendered page instance, thereby facilitating push operations from web server 140, as described below in further detail.

Each of the application servers 160A-160M executes (or hosts) applications that process user requests received from client systems 110A-110N, while potentially operating on the data stored in back-end databases such as data store 150. The output generated by such processing may be provided to end-users on client systems 110A-110N and/or stored again in data store 150. The user request and response combination may be viewed as one interaction. Each of the application servers 160A-160M provide various software infra-structure elements for execution of such applications.

The applications hosted in application servers 160A-160M may be implemented as "stateless" applications. As is well known in the relevant arts, stateless application is an application that does not internally record data generated in one user interaction for use in another interaction with the same user. Due to such stateless operation, the applications may be scalable and operate with a high throughput performance.

Web server 140 represents a computer system which serves web pages to client systems in response to corresponding (web page) requests. Each web page request may be processed according to the page definition associated with the request type, and in the process, application servers 160A-160M may be used for generating the content of the web page. The web page request may be viewed as representing the user request, and the web page (including content generated by the application servers) sent may be viewed as a response to the user request. Thus, web server 140 packages the content received from application server 160A in the form of a web page according to the page definition, and sends the formed web page as a response to the user request. Each such web page sent for rendering is termed as a page instance, reflecting the fact that the same page definition may be the basis for serving several page instances.

After sending a page instance for display, it may be desirable to update the display with information on events generated thereafter, as noted above with illustrative examples. As also noted there, pull-based approaches (from client systems) may be undesirable as causing unneeded processing and network overhead. Aspects of the present disclosure facilitate providing such updated information using push techniques, as described below with examples.

3. Pushing Events to Pages

Figure 2:
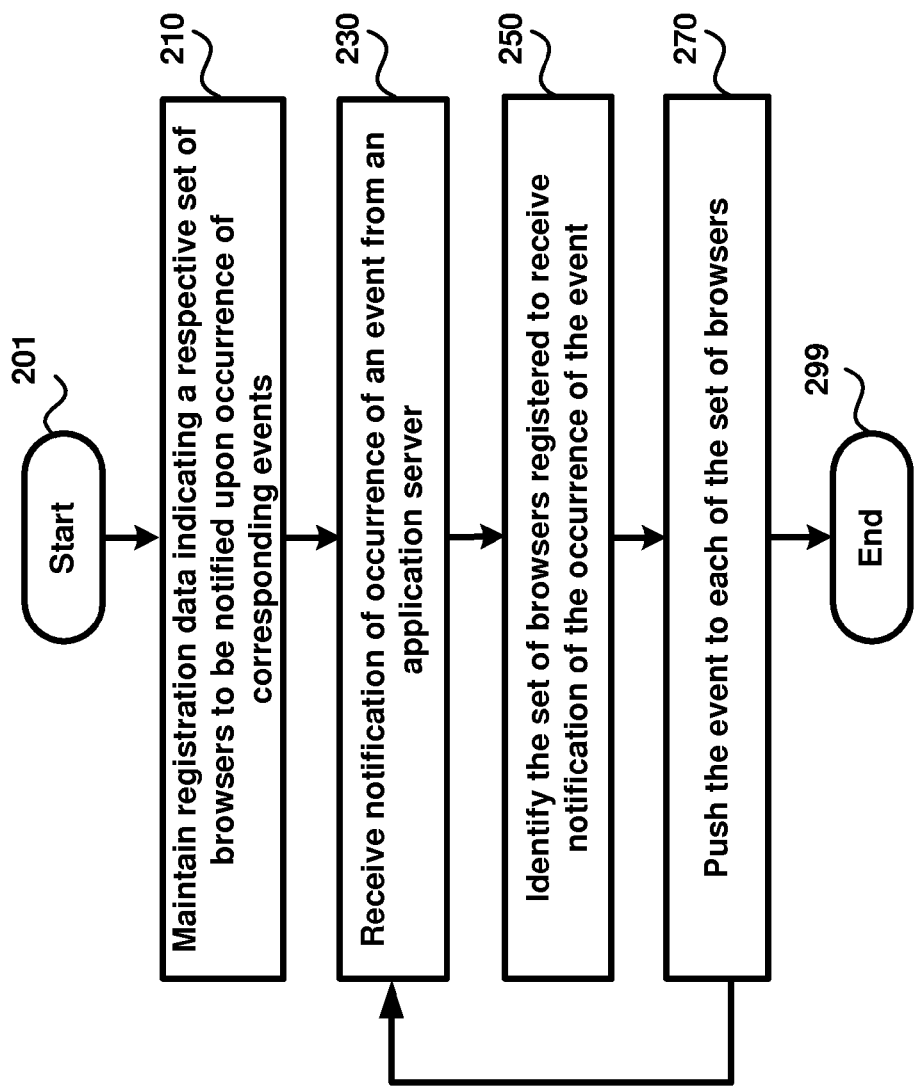
FIG. 2 is a flow chart illustrating the manner in which events are notified according to an aspect of the present disclosure.

FIG. 2 is a flow chart illustrating the manner in which events are notified, according to an aspect of the present disclosure. The flowchart is described with respect to the systems of FIG. 1 merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210. For ease of description, the flowchart is described in the context of client system 110A interfacing with web server 140 and application server 160A, even though other client systems and application servers can operate similar to client system 110A and application server 160A respectively.

In step 210 web server 140 maintains registration data indicating a respective set of browsers (currently rendering respective page instances) to be notified upon occurrence of corresponding events. Maintaining implies actions such as storing in a suitable memory storage, data representing the identity of page instances (including the browser on which each instance is rendered) currently being rendered, and the respective set of events subscribed to by each page, and retrieving of the relevant data when required.

In step 230, web server 140 receives notification of occurrence of an event from application server 160A. The event may be a result of operation of one of the applications executing in application server 160A or any other change in a state of interest. Some of the events of interest are noted above briefly.

In step 250, web server 140 identifies the set of browsers (if any) which have to be notified upon occurrence of the event in step 230, based on examining the registration data of step 210 for a browser-event match. Each event may be suitably identified by a unique identification in both the communications from application server 160A and in the registration data, and the registration data may accordingly be searched for entries having events with identification matching that received from application server 160A.

In step 270, web server 140 pushes the event to each of the browsers identified in step 250. Any supplementary information explaining the event may also be pushed. The event information thus pushed is thereafter rendered in each of the respective page instances implemented by the corresponding browsers. The flow chart ends in step 299.

As the maintenance of registration data and processing of events is performed in web server 140, application server 160A may be implemented with 'stateless' applications, thereby permitting scalability and portability of the applications. In addition, by pushing the events to browsers, pull-type techniques are avoided in browsers for the purpose of event notification.

The features described above with respect to FIG. 2 can be implemented in various embodiments, as will be apparent to one skilled in the relevant arts by reading the disclosure provided herein. The description is continued illustrating the manner in which events are notified in some example implementations.

4. Architecture

Figure 3:
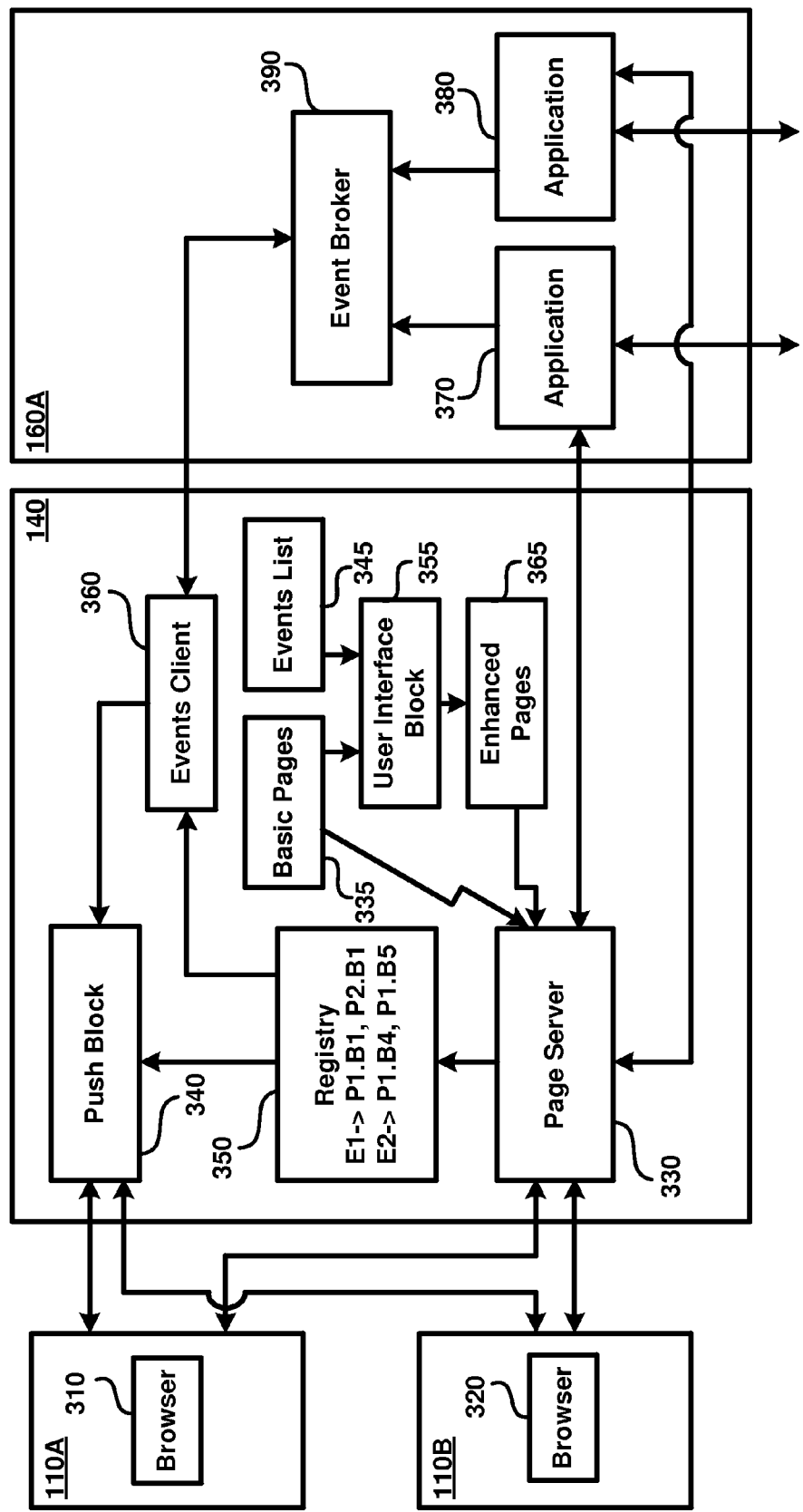
FIG. 3 is a block diagram illustrating internal details of various systems in an embodiment.

FIG. 3 is a block diagram illustrating the details of client systems 110A and 110B, web server 140, and application server 160A in an embodiment. Client systems 110A and 110B are shown executing (web) browsers 310 and 320 respectively. Web server 140 is shown containing page server 330, push block 340, registry 350, events client 360, basic pages 335, events list 345, user interface block 355, and enhanced pages 365. Application server 160A is shown containing applications 370 and 380, and event broker 390.

Each block may be realized as an appropriate combination of hardware, firmware and software, and is described below in further detail. For ease of description, the description is provided with reference to client system 110A and browser 310, even though other client systems (e.g., 110B) and browsers (e.g., 320) can operate similar to client system 110A and browser 310 respectively.

Each of applications 370 and 380 is designed to process user requests and provide corresponding response as content for inclusion in page instances. To process such user requests, applications 370 and 380 may be configured to store/retrieve data in/from data store 150, and utilize data in data store 150 to generate the responses. Each application may be implemented as a stateless application, while providing for event notification in conjunction with other blocks for web server 140, as described below in further detail. For ease of description, the description of applications is made with reference to application 370, even though other applications (e.g., 380) can operate similar to application 370.

Basic pages 335 represents page definitions, with each page definition providing specification of a web page. Some portion of the specification may specify static content and some portions may indicate the external sources (e.g., one of the applications 370/380) from which to request the corresponding content. The page definitions may be written in programming languages such as hypertext transfer language (HTML).

Events list 345 contains a list of events that are exposed by application servers 160A-160M in accordance with features of the present disclosure. As noted above, an event generally refers to any change of state that is of interest. In particular, events list 345 includes changes to some of the data elements that are maintained and made accessible to web pages by applications executing in application server 160A. Events list 345 also includes a change of state in physical or execution entities (e.g., processes, batch jobs, etc.) within application server 160A.

Enhanced pages 365 represent some of the basic pages, with additional content for associating and/or displaying event notifications. In one case, the additional content merely indicates a specific element of the page definition as corresponding to one of the events. In such a case, when there is a new value generated by an application, the prior value on the page instance is merely updated with the corresponding new value, as described below. In an alternative case, the additional content may also include JavaScript type programs embedded into the basic page, with the programs being designed to update the display of a page instance upon receipt of notification of an associated event.

User interface block 355 facilitates association of events (in events list 345) with page definitions of corresponding web pages in basic pages 335. In an embodiment, user interface block 355 associates one or more events from events list 345 with the page definition of a selected web page from basic pages 335, such that an "enhanced" page definition for the selected web page (or page definition) is produced.

Browser 310 sends page requests (e.g., specifying a URL in a HTTP request) upon corresponding user actions, and renders the received web pages as corresponding page instances. Browser 310 is provided the ability to receive push notifications corresponding to rendered page instances and provide a corresponding updated display on the relevant rendered page instance (corresponding to the enhanced pages). In an embodiment, browser 310 is implemented with Web Socket capability for receiving the push notifications, even though other alternative technologies with similar capability (to receive push notifications) will be apparent to one skilled in the relevant arts by reading the disclosure herein.

Page server 330 receives page requests from browsers, and in response, sends the corresponding web page for rendering as a page instance to the requesting browser. Page server 330 may maintain an internal mapping (not shown) mapping the URL (or any unique identifier of the web page of interest) in each page request to one of the pages in basic pages 335 or enhanced pages 365. Page server 330 then constructs the web page response in a known way, by interacting with application 370/380 if required. The web page thus formed is sent as a response to the corresponding page request.

Page server 330 permits a web connection to be established between browser 310 and web server 140. In an embodiment, page server 330 implements the web connection using hyper text transfer protocol (HTTP), well known in the relevant arts. In case of serving enhanced pages configured for receiving one or more notifications, page server 330 checks whether the requesting browser 310 supports Web Sockets. Assuming such support is present, page server 330 identifies the TCP port number in client system 110A for which the page request is received, and stores the port number in registry 350 for any subsequent push operations using the Web Sockets feature. In addition, registry is updated to store the events to which the page being served, is configured to be associated in enhanced pages 365. Storing of all such information amounts to registration of the page instance for the corresponding events, as described below in further detail.

Registry 350 stores the identity of page instances (including the browser on which each instance is rendered) currently being rendered by utilizing enhanced page definitions, and the respective set of events subscribed to by each page instance. Registry 350 is shown logically indicating that a first event E1 is associated with two page instances (P1 and P2) on the same browser (B1). Such a scenario may occur when a user opens two instances of a web page on the same browser (i.e., two windows or two tabs). As a further example, registry 350 also shows that a second event E2 is associated with page instances of different web browsers (B4 and B5). Such a scenario may occur when different page instances being rendered on different browsers/client systems, subscribe to a common event (i.e., E2).

While registry 350 is shown with registrations at a logical level, each browser instance may be identified by a combination of IP address and port number (from which the web page request is received). Each event may be identified by a corresponding unique identifier, which is consistently used in events list 345 and enhanced pages 365.

Event broker 390 is designed to identify occurrence of various events by the operation of applications 370/380. Event broker 390 is thus a component of the application server, which receives/stores a list of events that are subscribed, and identifies the occurrence of any of such events. The identified occurrences (including the detail such as event identifier and changed values/state, etc.) are notified to events client 360. For instance, if the event is defined as a change in value of a field on a web page, event broker 390 sends the identity of the field as well as the changed value of the field to events client 360.

Events client 360 identifies all events subscribed to by various page instances served by page server 330, and communicates the identity (list noted above) of all such events to event broker 390. Events client 360 examines registry 350 to formulate such a list. Upon receipt of indication of occurrence of one of such events from event broker 390, events client 360 passes along the identity of the (occurred) event to push block 340.

In one implementation, application server 160A is implemented based on Oracle Tuxedo software, from Oracle Corporation, which provides a platform for execution of applications 370/380, in addition to providing event broker 390. Complementing such implementation, events client 360 may be implemented according to Oracle Jolt interface, provided by Oracle Corporation. Oracle Jolt is a software program that provides a Java-based interface to the Oracle Tuxedo system, and extends the functionality of existing Tuxedo applications to include Intranet- and Internet-wide availability. It should however be appreciated that alternative combinations of implementations, as suited for the corresponding environments, can be chosen, without departing from the scope and spirit of various aspects of the present disclosure.

Push block 340, upon receiving indication of occurrence of an event from events client 360, pushes the event and any associated data to the browsers (or page instances) indicated to be subscribing to the event, by registry 350. Thus, push block 340 examines registry 350 to identify the entry (or entries) matching the occurred event and retrieves the relevant data to perform the push operation.

Though shown as a separate block, push block 340 may be integrated into page server 330. For effecting the push operation, in an embodiment, push block 340 implements a Web Socket technology, well known in the relevant arts. The port number and IP address of the client system 110A, stored (in registry 350) associated with the page instance, is used to push the details of the event. The corresponding operation may thus be viewed as creating a persistent (i.e., always open) connection between browser 310 and web server 140.

Accordingly, browser 310 receives the event and any associated data and updates the display of the corresponding page instance to reflect the occurrence of the event and to present any associated data received. Thus, by subscribing to events on a web server, page instances and associated browsers are provided with data associated with events on the occurrence of events, without the unneeded overhead of pull-based approaches where the browsers may periodically request updated information, without knowledge of whether or not such events had occurred.

The description is continued with respect to a sequence diagram implementing at least some of the features of the flow chart of FIG. 2 along with FIG. 3.

5. Sequence Diagram

Figure 4:
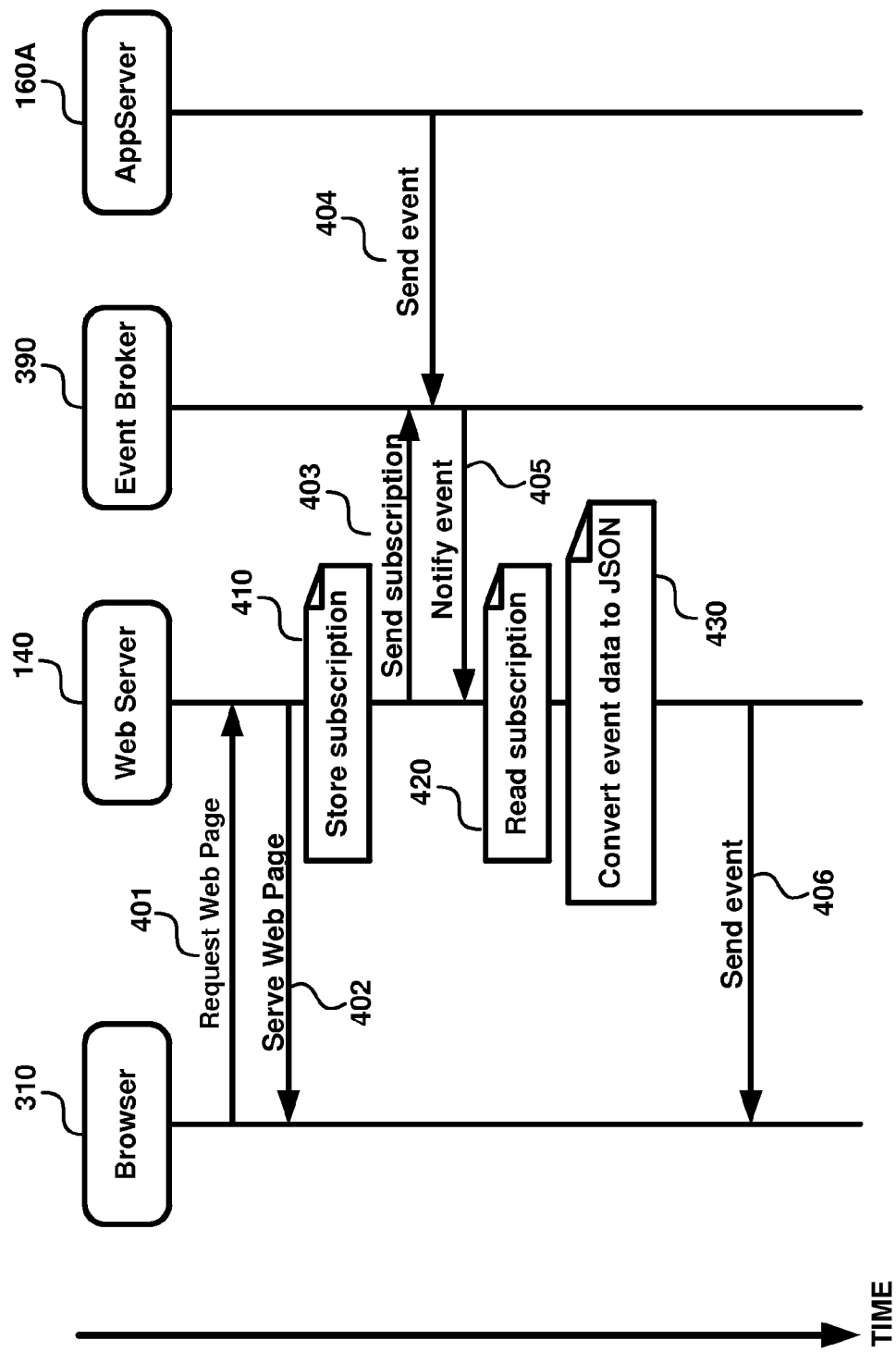
FIG. 4 is a sequence diagram illustrating the manner in which events are subscribed to and the corresponding notifications received, in an embodiment.

FIG. 4 is a sequence diagram illustrating the manner in which events are subscribed to and received, in an embodiment. The description is continued assuming that a web page, when later rendered as a page instance, needs to be updated with events generated in application server 160A. It is also assumed that both browser 310 and web server 140 support Web Socket protocol for the requisite push operation.

Browser 310 sends a request for a web page to web server 140 (activity 401). The request may be encapsulated in a TCP/IP packet having a source TCP port number, identifying the end point of a TCP connection for receiving the web page. Assuming browser 310 supports Web Socket feature, the requested TCP connection is upgraded to a Web Socket connection.

In activity 402, web server 402 is shown sending a formed web page to browser 310 as a response to the request of 401. The web page is encapsulated in TCP/IP packets with the destination TCP port number matching the source portion number of activity 401.

In action 410, page server 330 is shown storing in registry 350 the subscription information, including the identity of browser 310/page instance (as the TCP port and IP address of client system 110A) subscribing for the event, and the identifier of the event itself. Action 410 may occur concurrent with or before activity 402.

In activity 403, events client 360, examines registry 350 and identifies the event subscribed to by the page instance. Events client 360 communicates the identity of the events to event broker 390.

Upon occurrence of the event, application server 160A sends the event to event broker 390 (activity 404). Sending of the event includes sending detail such as the event identifier, and data pertaining to changed values/state associated with the event, etc. Alternatively, event broker 390 may be designed to trap/track changes to values of variables, etc., to be able to identify the occurrence of the events.

Upon receipt of indication of occurrence of the event, event broker 390 notifies the event (including the identification details and any data, as described in activity 404 above) to events client 360 in web server 140 (activity 405). Events client 360 passes along the identity of the event to push block 340. Push block 340 examines registry 350 to identify the page instance/browser matching the event (action 420).

Push block 340 then parses the event and generates a data structure (e.g., in JavaScript Object Notation, JSON) that is readable by browser 310 (action 430). Push block 340 then pushes the event and any associated data to the page instance/browser identified during action 420 (activity 406), where it is rendered on the corresponding page instance.

Thus, a web page is enabled to subscribe to an event and to receive the event and any data associated with the event upon the occurrence of the event.

The description is continued with respect to example user interfaces implementing at least some of the features of the flow chart of FIG. 2.

6. Example User Interfaces

Figure 5:
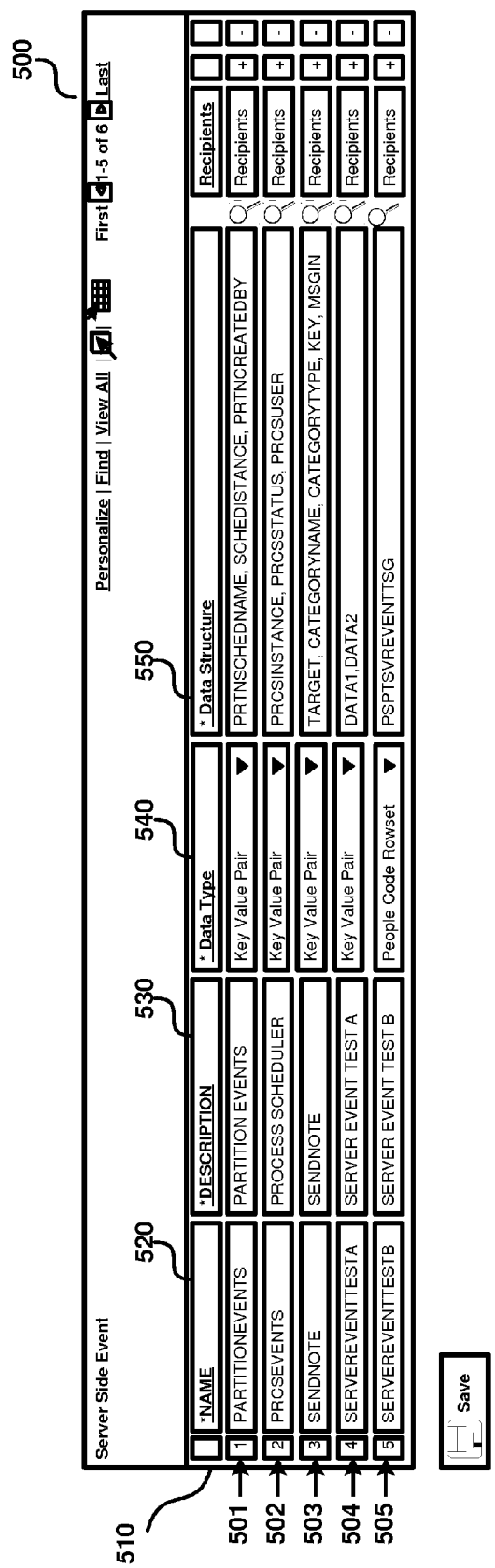
FIG. 5 is a screenshot illustrating the manner in which a user reviews a list of all available events in an embodiment.
Figure 6:
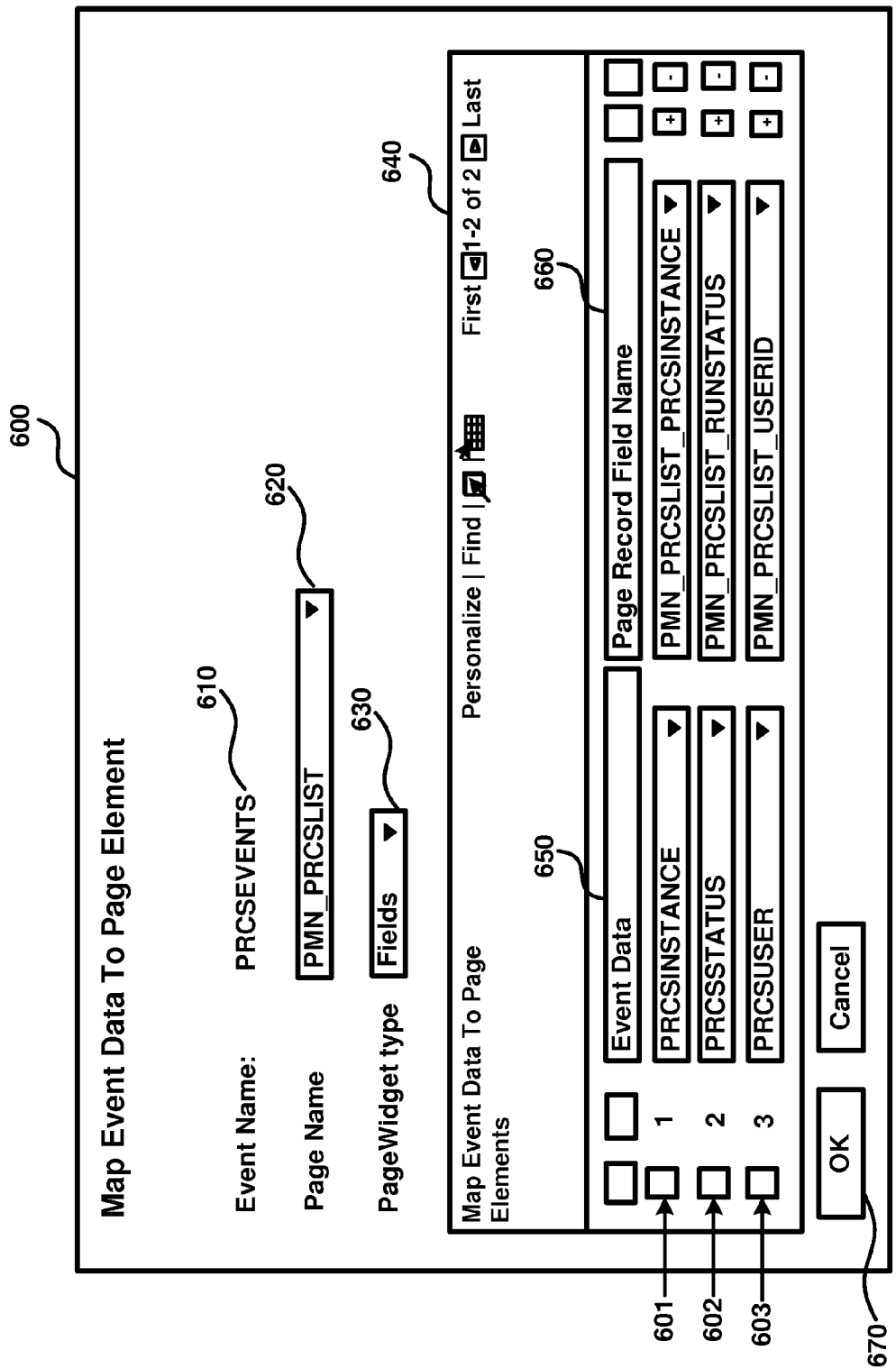
FIG. 6 is a screenshot illustrating the manner in which one or more events are subscribed to in a basic page, in an embodiment.

FIGS. 5-6 depict respective display screens as user interface block 355 facilitates a user to associate relevant events with each web page (and thereby cause registration). In particular, FIG. 5 illustrates an example user interface using which a user reviews a list of all available events in one embodiment. FIG. 6 illustrates an example user interface using which one or more events are subscribed to in a basic page, in an embodiment.

Referring to FIG. 5, display area 500 depicts a portion of a user interface that is provided on a display unit of administrator system (not shown) upon a request from a user for events available for subscription. The events may be required based on specific application or specific web page of interest.

Display area 500 is thus shown displaying some of the events present in events list 345 described above, where the events list 345 contains a list of events that are exposed by application servers 160A-160M.

The user begins interacting with the display area 500 by reviewing one or more available events in the display portion 510. Each of the available events 501-505 displays several columns of data as shown in columns 520-550.

To illustrate, for an event 502, column 520 shows the name of the event as prcsevents. In column 530, a description of the event is provided. In case of event 502, the description of the event is shown as process scheduler, referring to the nature of the event being one that is generated by a scheduled process within application server 160A. Columns 540 and 550 together define the data model of an event. In particular, column 540 shows the data type of the event.

In case of event 502, column 540 shows that the event is structured as a key-value pair (i.e., for every key/attribute, there is an associated value), a data type well known in the relevant arts. Column 550 shows the data structure of the event. In case of event 502, column 550 shows that the event's data structure is organized in three keys, prcsinstance, prcsstatus, and prcsuser. It will be understood that each of the three keys will have a value associated with it.

FIG. 6 depicts the display screen as a user at the administration system associates events of interest to corresponding page elements of a web page. As noted earlier, user interface block 355 facilitates association of events (in events list 345) with page definitions of corresponding web pages in basic pages 335.

A (administrator) user first selects an event from the available events (as shown in FIG. 5). The selected event, prcsevents (in row 502), is shown at 610. In drop down box 620, the user selects a basic page pmn_prcslist of pages 335/365. In row 630, the user chooses the option to map the event data structure (or specifically, the keys) to fields (i.e., elements) contained in the page definition of the selected basic page.

Display portion 640 shows the mapping between the selected event's data structure and the page elements contained within the selected basic page's page definition. Column 650 shows the keys in the data structure of the selected event. As shown in row 502 of FIG. 5, the event prcsevents was shown containing 3 keys, prcsinstance, prcsstatus, and prcsuser. All three of these keys are shown as being populated in column 650 in rows 601-603 respectively. In column 660, the user may choose to map/associate each of the keys with a page element in the selected basic page's page definition. As shown, key prcsinstance is shown associated with page element pmn_prcslist_prcsinstance, key prcsstatus is shown associated with page element pmn_prcslist_runstatus, and key prcsuser is shown associated with page element pmn_prcslist_userid. The user may then save the basic page along with the association of the event keys with page elements to generate an enhanced page, as described earlier with reference to enhanced pages 365.

The description is continued with respect to the manner in which the web page PMN_PRCSLIST is thereafter rendered, and a subscribed event pushed upon the corresponding change.

7. Updated Display Upon Event Push

FIG. 7A depicts a page instance, corresponding to web page PMN_PRCSLIST, rendered on client system 110A. Display area is shown containing rows 701-707, each corresponding to a process. Columns instance 710, run status 760 and process name 730 are assumed to correspond to PRCSINSTNACE, RUNSTATUS and USERID in field name 660.

As may be readily observer, the process PSXPCLEAN of row 701 is shown in QUEUED status in column 760. After the sending of the web page corresponding to FIG. 7A, it is assumed that the status of the process PSXCLEAN is changed to 'Success', thereby constituting occurrence of an event. The new value for the field element (intersection of row 701 and column 760) is accordingly pushed to page instance 700 as described above. The value of the field element is updated, with the remaining values of the page being unchanged, as shown in FIG. 7B.

Thus, FIGS. 6, 7A and 7B together illustrate the manner in which the value on a page instance is updated, due to the push operation. However, in case of some other fields, the Java Scripts noted above may receive the push notifications and provide more complex display (e.g., including explanatory text).

It should be appreciated that the features described above can be implemented in various embodiments as a desired combination of one or more of hardware, executable modules, and firmware. The description is continued with respect to an embodiment in which various features are operative when executable modules are executed.

8. Digital Processing System

Figure 8:
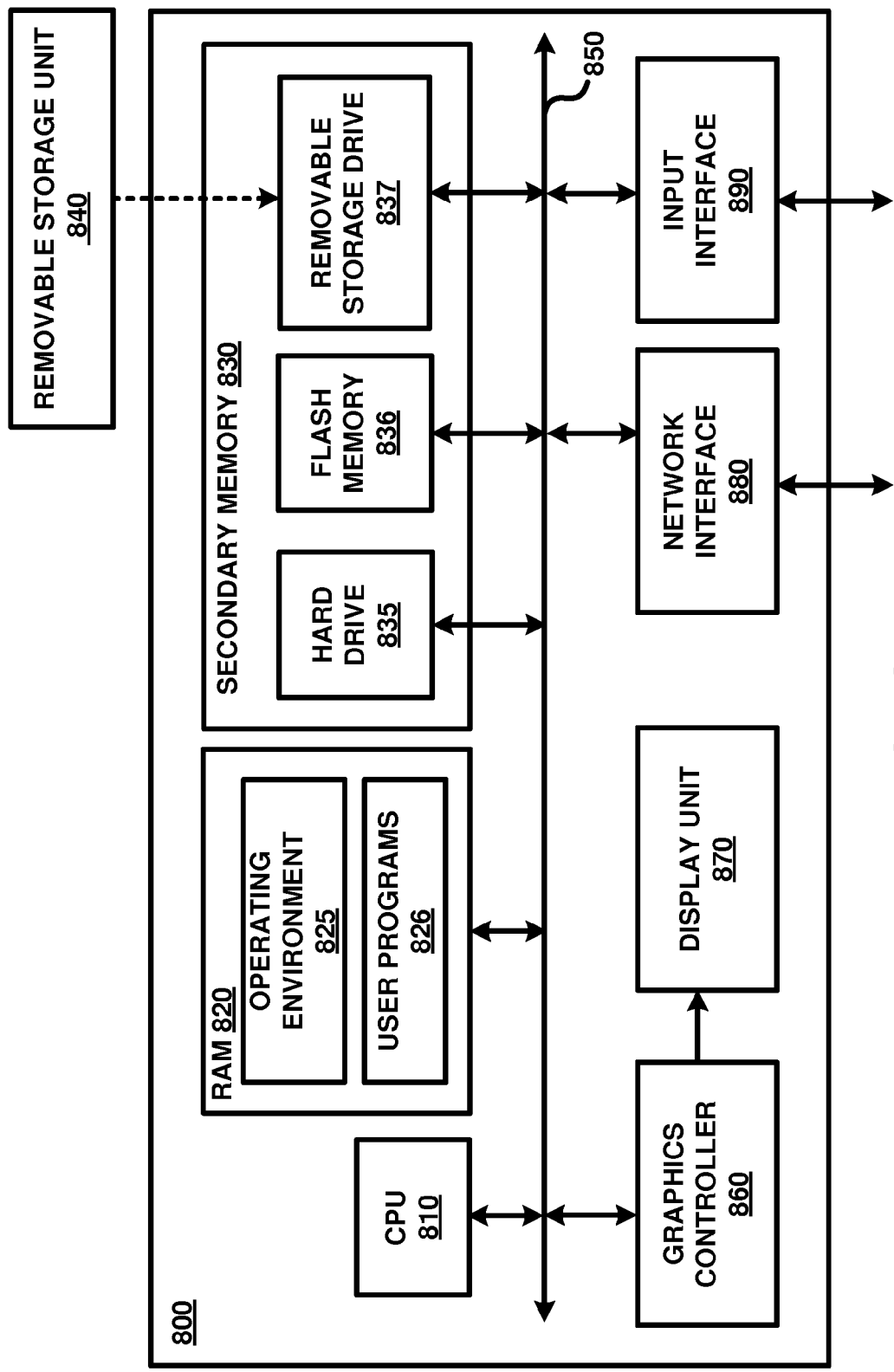
FIG. 8 is a block diagram illustrating the details of a digital processing system in which several aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to web server 140.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as analytical applications, etc.). Shared environment 825 may contain software programs such as device drivers, virtual machines, etc., which provide a (common) run time environment for execution of the user programs.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems connected to the network (110A-N, 150 and 160A-M of FIG. 1).

Secondary memory 830 may contain hard drive 835, flash memory 836, and removable storage drive 837. Secondary memory 830 may store the data (for example, basic and enhanced pages, event lists, etc.) and software instructions (for implementing the steps of FIG. 2), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Secondary memory 830 may contain hard drive 835, flash memory 836, and removable storage drive 837. Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a web server, said method comprising:

storing enhanced page data associating each page definition of a plurality of page definitions to a corresponding set of events, each of said plurality of page definitions being used by said web server to serve corresponding web pages;

receiving a request for a first web page from a first web browser executing at a client system;

forming said first web page based on a first page definition of said plurality of page definitions;

examining said enhanced page data to identify that a first set of events is associated with said first page definition in said enhanced page data;

serving said first web page to said client system for rendering as a first page instance on said first web browser at said client system;

maintaining, in said web server, registration data indicating a respective set of browsers to be notified upon occurrence of corresponding events, wherein said maintaining comprises adding data to said registration data to indicate that said first web browser is subscribed to receive said first set of events in view of said identification of said first set of events associated with said first page definition in said enhanced page data, wherein said forming, said examining, said serving and said adding are performed in said web server in response to said request;

receiving, in said web server, occurrence of an event of said first set of events from an application server;

examining said registration data, in said web server, to determine a set of browsers registered to receive notification of the occurrence of said event, wherein said set of browsers includes said first web browser; and pushing said event to each of said set of browsers including said first web browser.

2. The method of claim 1, wherein said event is generated by operation of a stateless application implemented in said application server, wherein said web server receives notification of occurrence of said event upon generation of said event.

3. The method of claim 2, wherein said forming comprises including a first value of a field in said first page instance, wherein said event comprises generating of a new value for said field by said stateless application, wherein said application server notifies said web server of change of value for said field as said event, wherein said pushing pushes said new value to said first web browser at said client system, wherein said first web browser is designed to display said new value for said field in said first page instance upon receipt of said new value.

4. The method of claim 3, wherein said first web browser and said web server are coupled to communicate via Web Socket protocol on a Transmission Control Protocol (TCP) connection established between said web server and said first web browser.

5. The method of claim 4, wherein said registration data comprises an Internet Protocol (IP) address of said client system, a TCP port number associated with said first page instance at said client system, and an event identifier uniquely identifying said event among said set of events.

6. The method of claim 2, wherein said stateless application exposes a plurality of events that are generated by said stateless application, said method further comprising:

receiving inputs from an administrator identifying said first set of events associated with said first page definition, said first set of events being contained in said plurality of events, wherein data is maintained in said enhanced page data associating said plurality of events with said first page definition in response to receipt of said inputs from said administrator.

7. A non-transitory machine readable medium storing one or more sequences of instructions which upon execution by one or more processors contained in a web server causes said web server to perform the actions of:

storing enhanced page data associating each page definition of a plurality of page definitions to a corresponding set of events, each of said plurality of page definitions being used by said web server to serve corresponding web pages;

receiving a request for a first web page from a first web browser executing at a client system;

forming said first web page based on a first page definition of said plurality of page definitions;

examining said enhanced page data to identify that a first set of events is associated with said first page definition in said enhanced page data;

serving said first web page to said client system for rendering as a first page instance on said first web browser at said client system;

maintaining registration data indicating a respective set of browsers to be notified upon occurrence of corresponding events, wherein said maintaining comprises adding data to said registration data to indicate that said first web browser is subscribed to receive said first set of events in view of said identification of said first set of events associated with said first page definition in said enhanced page data, wherein said forming, said examining, said serving and said adding are performed in said web server in response to said request;

receiving occurrence of an event of said first set of events from an application server;

examining said registration data to determine a set of browsers registered to receive notification of the occurrence of said event, wherein said set of browsers includes said first web browser; and pushing said event to each of said set of browsers including said first web browser.

8. The non-transitory machine readable medium of claim 7, wherein said event is generated by operation of a stateless application implemented in said application server, wherein said web server receives notification of occurrence of said event upon generation of said event.

9. The non-transitory machine readable medium of claim 8, wherein said forming comprises including a first value of a field in said first page instance, wherein said event comprises generating of a new value for said field by said stateless application, wherein said application server notifies said web server of change of value for said field as said event, wherein said pushing pushes said new value to said first web browser at said client system, wherein said first web browser is designed to display said new value for said field in said first page instance upon receipt of said new value.

10. The non-transitory machine readable medium of claim 9, wherein said first web browser and said web server are coupled to communicate via Web Socket protocol on a Transmission Control Protocol (TCP) connection established between said web server and said first web browser.

11. The non-transitory machine readable medium of claim 10, wherein said registration data comprises an Internet Protocol (IP) address of said client system, a TCP port number associated with said first page instance at said client system, and an event identifier uniquely identifying said event among said set of events.

12. The non-transitory machine readable medium of claim 8, wherein said stateless application exposes a plurality of events that are generated by said stateless application, said actions further comprising:
   receiving inputs from an administrator identifying said first set of events associated with said first page definition, said first set of events being contained in said plurality of events,
   wherein data is maintained in said enhanced page data associating said plurality of events with said first page definition in response to receipt of said inputs from said administrator.

13. A web server comprising:
one or more processing units;
one or more random access memories (RAMs);
a non-transitory machine readable medium to store one or more instructions, which when retrieved into said RAMs and executed by said one or more processing units causes said web server to perform the actions of:
   storing enhanced page data associating each page definition of a plurality of page definitions to a corresponding set of events, each of said plurality of page definitions being used by said web server to serve corresponding web pages;
   receiving a request for a first web page from a first web browser executing at a client system;
   forming said first web page based on a first page definition of said plurality of page definitions;
   examining said enhanced page data to identify that a first set of events is associated with said first page definition in said enhanced page data;
   serving said first web page to said client system for rendering as a first page instance on said first web browser at said client system;
   maintaining, in said web server, registration data indicating a respective set of browsers to be notified upon occurrence of corresponding events, wherein said maintaining comprises adding data to said registration data to indicate that said first web browser is subscribed to receive said first set of events in view of said identification of said first set of events associated with said first page definition in said enhanced page data,
   wherein said forming, said examining, said serving and said adding are performed in said web server in response to said request;
   receiving occurrence of an event of said first set of events from an application server;
   examining said registration data to determine a set of browsers registered to receive notification of the occurrence of said event, wherein said set of browsers includes said first web browser; and
   pushing said event to each of said set of browsers including said first web browser.

14. The web server of claim 13, wherein said event is generated by operation of a stateless application implemented in said application server, wherein said web server receives notification of occurrence of said event upon generation of said event.

15. The web server of claim 14, wherein said forming comprises including a first value of a field in said first page instance,
   wherein said event comprises generating of a new value for said field by said stateless application,
   wherein said application server notifies said web server of change of value for said field as said event,
   wherein said pushing pushes said new value to said first web browser at said client system,
   wherein said first web browser is designed to display said new value for said field in said first page instance upon receipt of said new value.

16. The web server of claim 15, wherein said first web browser and said web server are coupled to communicate via Web Socket protocol on a Transmission Control Protocol (TCP) connection established between said web server and said first web browser,
   wherein said registration data comprises an Internet Protocol (IP) address of said client system, a TCP port number associated with said first page instance at said client system, and an event identifier uniquely identifying said event among said set of events.

17. The web server of claim 14, wherein said stateless application exposes a plurality of events that are generated by said stateless application, said actions further comprising:
   receiving inputs from an administrator identifying said first set of events associated with said first page definition, said first set of events being contained in said plurality of events,
   wherein data is maintained in said enhanced page data associating said plurality of events with said first page definition in response to receipt of said inputs from said administrator.

* * * * *

UNITED STATES PATENT AND TRADEMARK OFFICE
CERTIFICATE OF CORRECTION

PATENT NO. : 9,742,818 B2
APPLICATION NO. : 14/566697
DATED : August 22, 2017
INVENTOR(S) : Ibrahimkutty et al.

It is certified that error appears in the above-identified patent and that said Letters Patent is hereby corrected as shown below:

On the Title Page

Column 2, under Attorney, Agent or Firm, Line 1, delete "IP Horizons" and insert -- IPHorizons --, therefor.

In the Specification

In Column 7, Line 12, delete "hyper text" and insert -- hypertext --, therefor.

In Column 10, Line 50, delete "PRCSINSTNACE," and insert -- PRCSINSTANCE, --, therefor.

Signed and Sealed this
Twenty-second Day of May, 2018

Andrei Iancu
*Director of the United States Patent and Trademark Office*